United States Patent
Satoh

(10) Patent No.: US 7,421,091 B2
(45) Date of Patent: Sep. 2, 2008

(54) IMAGE-CAPTURING APPARATUS

(75) Inventor: Hiroshi Satoh, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 712 days.

(21) Appl. No.: 10/829,383

(22) Filed: Apr. 22, 2004

(65) Prior Publication Data

US 2004/0233300 A1    Nov. 25, 2004

(30) Foreign Application Priority Data

May 20, 2003  (JP)  ............................. 2003-142536
Mar. 15, 2004  (JP)  ............................. 2004-072530

(51) Int. Cl.
*G06K 9/00*    (2006.01)
(52) U.S. Cl. ..................... 382/103; 382/255; 348/208.1
(58) Field of Classification Search ................ 382/103, 382/104, 106–107, 168, 181, 190–194, 232, 382/255, 260, 274, 275, 286, 291, 295, 312; 250/221, 208.1; 280/735; 700/83; 396/55; 348/208.99, 208.1
See application file for complete search history.

(56) References Cited

U.S. PATENT DOCUMENTS

| | | | |
|---|---|---|---|
| 6,501,503 B2 * | 12/2002 | Kudo | 348/208.99 |
| 6,778,766 B2 * | 8/2004 | Tomita | 396/55 |
| 6,858,827 B2 * | 2/2005 | Sugiyama et al. | 250/208.1 |
| 6,968,073 B1 * | 11/2005 | O'Boyle et al. | 382/104 |
| 7,136,710 B1 * | 11/2006 | Hoffberg et al. | 700/83 |
| 7,147,246 B2 * | 12/2006 | Breed et al. | 280/735 |
| 7,164,117 B2 * | 1/2007 | Breed et al. | 250/221 |

FOREIGN PATENT DOCUMENTS

| | | |
|---|---|---|
| JP | 5-48973 | 2/1993 |
| JP | 5-64082 | 3/1993 |
| JP | 6-62325 | 3/1994 |
| JP | 6-209434 | 7/1994 |
| JP | 6-284344 | 10/1994 |
| JP | 7-46608 | 2/1995 |
| JP | 8-79630 | 3/1996 |
| JP | 8-307774 | 11/1996 |
| JP | 9-18788 | 1/1997 |
| JP | 9-46596 | 2/1997 |
| JP | 9-182090 | 7/1997 |
| JP | 10-200908 | 7/1998 |
| JP | 10-224809 | 8/1998 |
| JP | 11-55575 | 2/1999 |
| JP | 11-69210 | 3/1999 |
| JP | 11-298800 | 10/1999 |
| JP | 11-298911 | 10/1999 |

(Continued)

*Primary Examiner*—Seyed Azarian
(74) *Attorney, Agent, or Firm*—McDermott Will & Emery LLP

(57) ABSTRACT

Outputs of pixels present around a given pixel at an image-capturing unit having a plurality of pixels disposed two-dimensionally are added to the output of the given pixel. During this process, the addition pattern with which the pixel outputs are added together is determined in correspondence to a specific type of image processing to be executed at a subsequent stage, and an image is generated by adding together the pixel outputs constituting image signals output from the image-capturing unit based upon the addition pattern. The image resulting from the addition then undergoes the image processing and the processed image is output.

19 Claims, 8 Drawing Sheets

FOREIGN PATENT DOCUMENTS

| | | |
|---|---|---|
| JP | P2000-69491 A | 3/2000 |
| JP | P2001-16597 A | 1/2001 |
| JP | P2001-285719 A | 10/2001 |
| JP | P2001-292376 | 10/2001 |
| JP | P2002-10140 A | 1/2002 |

\* cited by examiner

IMAGE-CAPTURING APPARATUS

BACKGROUND OF THE INVENTION

1. Field of the Invention

The present invention relates to an image-capturing apparatus achieved by using a solid-state image-capturing element.

2. Description of the Related Art

Solid-state image-capturing apparatuses that improve the sensitivity by adding together electrical charges stored at adjacent pixels along the horizontal direction at a CCD solid-state image-capturing element and also minimize the extent of degradation of the horizontal resolution attributable to the addition include the one disclosed in Japanese Laid Open Patent Publication No. H 06-209434.

Image signals are processed as described below in the image-capturing apparatus in the related art mentioned above. A reset pulse is applied to a reset gate of the CCD solid-state image-capturing element through intermittent drive over 2-pixel cycles and thus, the electrical charges stored at pixels adjacent to each other along the horizontal direction are mixed together to realize a sensitivity level twice as high. In addition, by adopting a combination of phase control of the reset pulse and interpolation processing of signals achieved based upon vertical correlation, the extent to which the horizontal resolution is lowered is reduced to ¾. However, it is inevitable that the resolution still becomes poorer.

SUMMARY OF THE INVENTION

According to the present invention, outputs of pixels located around a given pixel at an image-capturing unit are added to the output of that pixel before executing image processing on image signals output from the image-capturing unit having a plurality of pixels disposed two-dimensionally. An addition pattern with which pixel outputs are added together is determined in correspondence to the specific type of image processing to be executed and the pixel outputs constituting the image signals output from the image-capturing unit are added in conformance to the addition pattern to generate an image. Then, the image processing is executed on the image resulting from the addition and the image having undergone the image processing is output.

Instead of determining the addition pattern with which the pixel outputs are added together in correspondence to the type of image processing, the addition pattern may be determined in correspondence to a specific vehicular behavior. Alternatively, the pixel output addition pattern may be determined in correspondence to the extent of vibration that the image-capturing apparatus experiences.

DESCRIPTION OF THE PREFERRED EMBODIMENTS

First Embodiment

Figure 1:
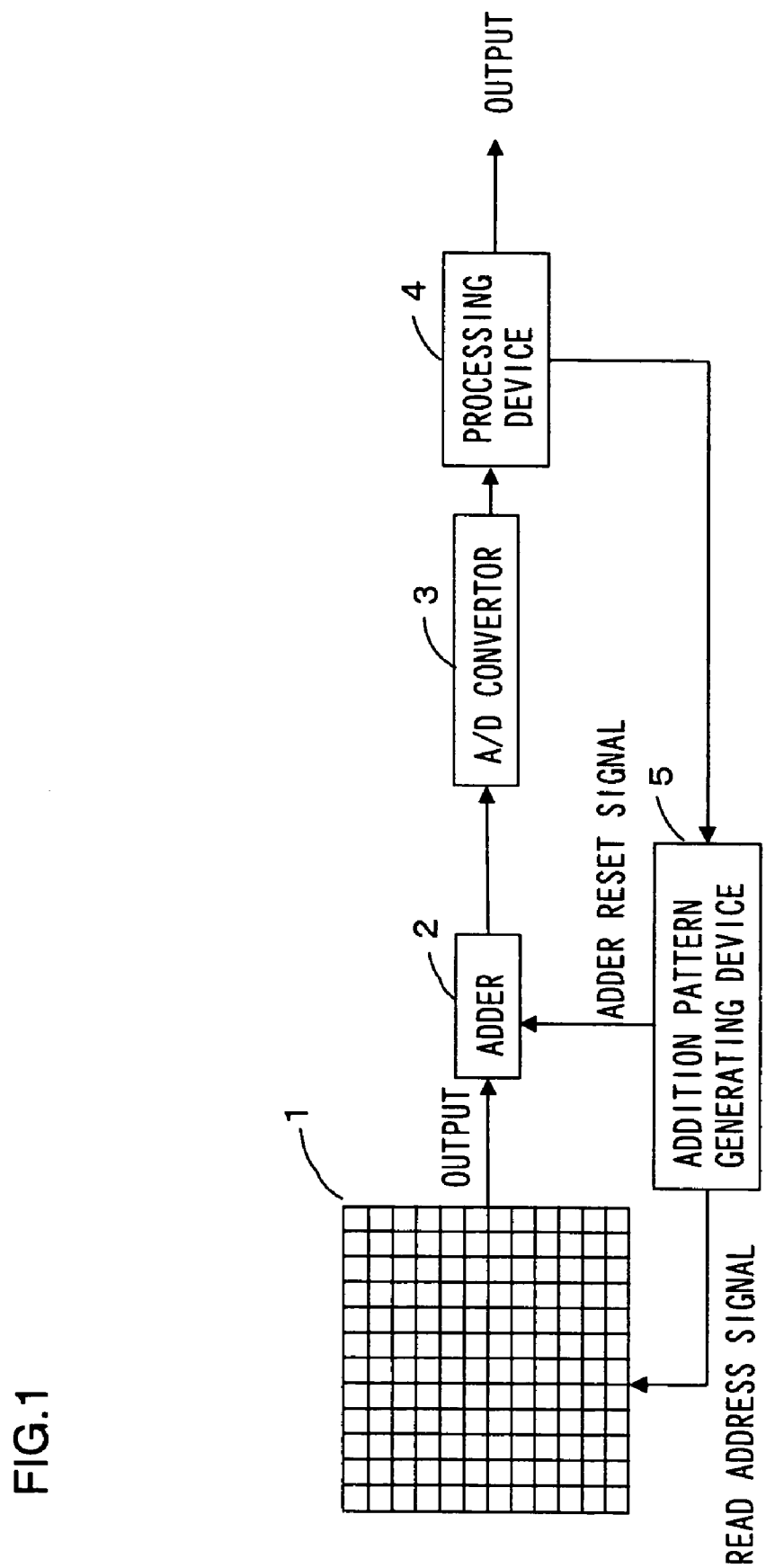
FIG. 1 shows the structure adopted in the image-capturing apparatus achieved in a first embodiment.

FIG. 1 shows the structure adopted in an image-capturing apparatus achieved in the first embodiment. The image-capturing apparatus includes an image-capturing element 1, an adder 2, an A/D converter 3, an processing device 4 and an addition pattern generating device 5.

The image-capturing element 1 is a semiconductor device adopting a CMOS structure which includes a plurality of light receiving elements disposed two-dimensionally and a read circuit that reads output voltages from the individual light receiving elements. The image-capturing element 1 outputs the output voltages from light receiving elements specified with read address signals as output voltages of the image-capturing element 1.

The adder 2 adds the output signals from light receiving elements at addresses specified by the addition pattern generating device 5 which is to be detailed later until a reset signal is output from the addition pattern generating device 5. In other words, the adder 2 generates a new image by adding the outputs of pixels present around a given pixel at the image-capturing element 1 to the output from the pixel.

During the add processing executed by the adder 2, the pixel outputs may be added together by weighting the outputs in correspondence to the individual light receiving elements instead of simply adding them together. In such a case, the addition pattern generating device 5 may output weighting elements, or if weighting elements are fixed, the weighting elements may be automatically generated at the adder 2.

The A/D converter 3 executes analog-digital conversion so as to enable digital processing of the output from the adder 2. The A/D converter 3 is achieved by using a device and circuits known in the related art.

The processing device 4 executes image processing on the image-capturing signals having undergone the digital conversion to detect a vehicle present ahead, to detect the road conditions and the like. Such detections can be executed by adopting a method known in the related art. The processing device 4 also outputs information indicating the type of image processing to be executed to the addition pattern generating device 5. For instance, when executing longitudinal edge detection (vertical edge detection) through longitudinal Sobel filter arithmetic processing on 3×3 pixel data to detect a white line drawn on a road, a signal indicating that image processing for longitudinal edge detection is to be executed (hereafter referred to as an image processing type signal) is output to the addition pattern generating device 5.

The addition pattern generating device 5, to which the image processing type signal is input from the processing device 4, generates a combination pattern or an addition pattern with which pixels are to be combined for the addition of the outputs thereof in correspondence to the processing type and outputs address signals specifying light receiving elements in correspondence to the addition pattern to the image-capturing element 1. In addition, the addition pattern generating device 5 outputs a reset signal to the adder 2 to initialize the adder 2.

The combination pattern with which pixels are combined for the addition in correspondence to the type of image processing should be regarded as a pattern that will yield optimal results for a specific processing purpose, e.g., a pattern with which the outputs from three light receiving elements continuous along the lateral direction are added together or a pattern with which the outputs of every second light receiving element along the longitudinal direction for a total of four light receiving elements are added together.

FIGS. 2 to 5 show the results of image processing executed by using various sum image signals obtained in the image-capturing apparatus in the first embodiment. In FIGS. 2-5, images 100, 200, 300 and 400 show the original image captured by the image-capturing element 1, images 110, 210, 310 and 410 show a new image generated by adding the outputs of pixels present around a given pixel to the output of the pixel through a specific addition pattern at the adder 2 and images 120, 220, 320 and 420 show the results of a specific edge detection executed by the processing device 4 by using the new image.

Figure 2:
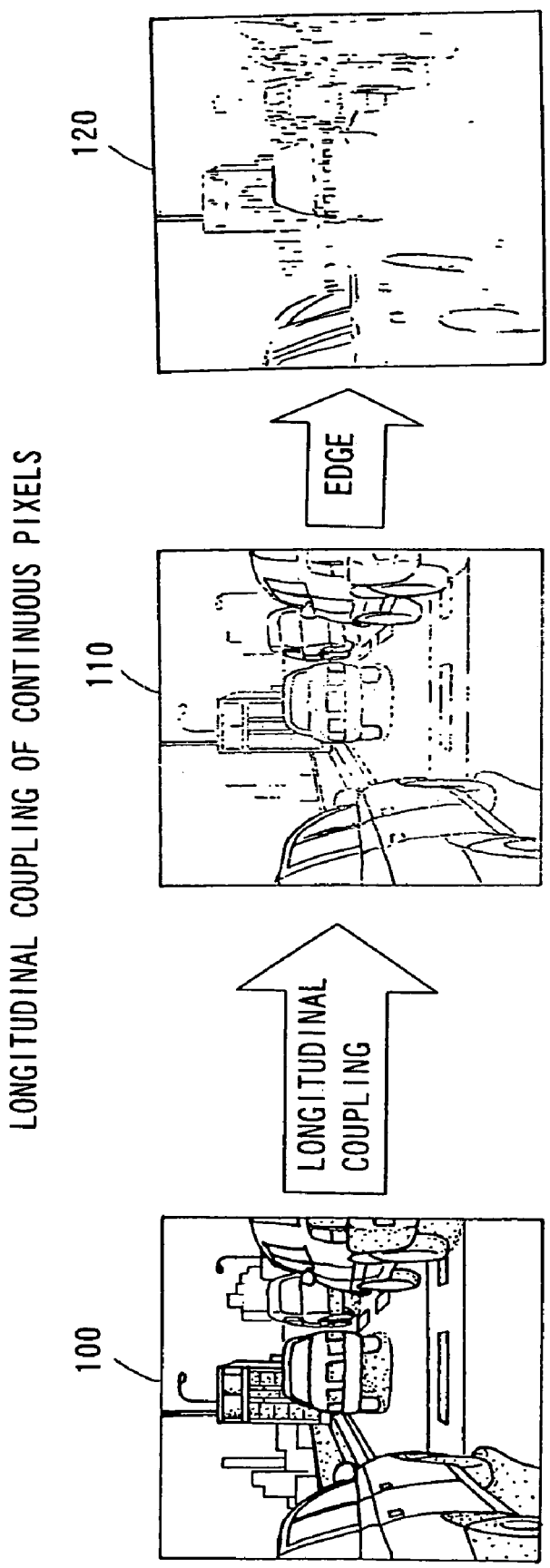
FIG. 2 shows the results of image processing executed by adding pixel outputs along the longitudinal direction.

FIG. 2 shows the results of image processing executed by using the sums of outputs from pixels continuous along the longitudinal direction (vertical direction). By adding together the outputs of pixels continuous along the longitudinal direction, a bright image can be obtained without lowering the resolution along the lateral direction (horizontal direction). For this reason, a bright and high-contrast image can be obtained even in an environment with a low level of illumination, e.g., night time. The outputs from pixels continuous along the longitudinal direction should be added together when, for instance, the processing device 4 is to execute image processing such as pedestrian detection in which a longitudinal edge component (a vertical edge component) of a target object needs to be extracted accurately.

Figure 3:
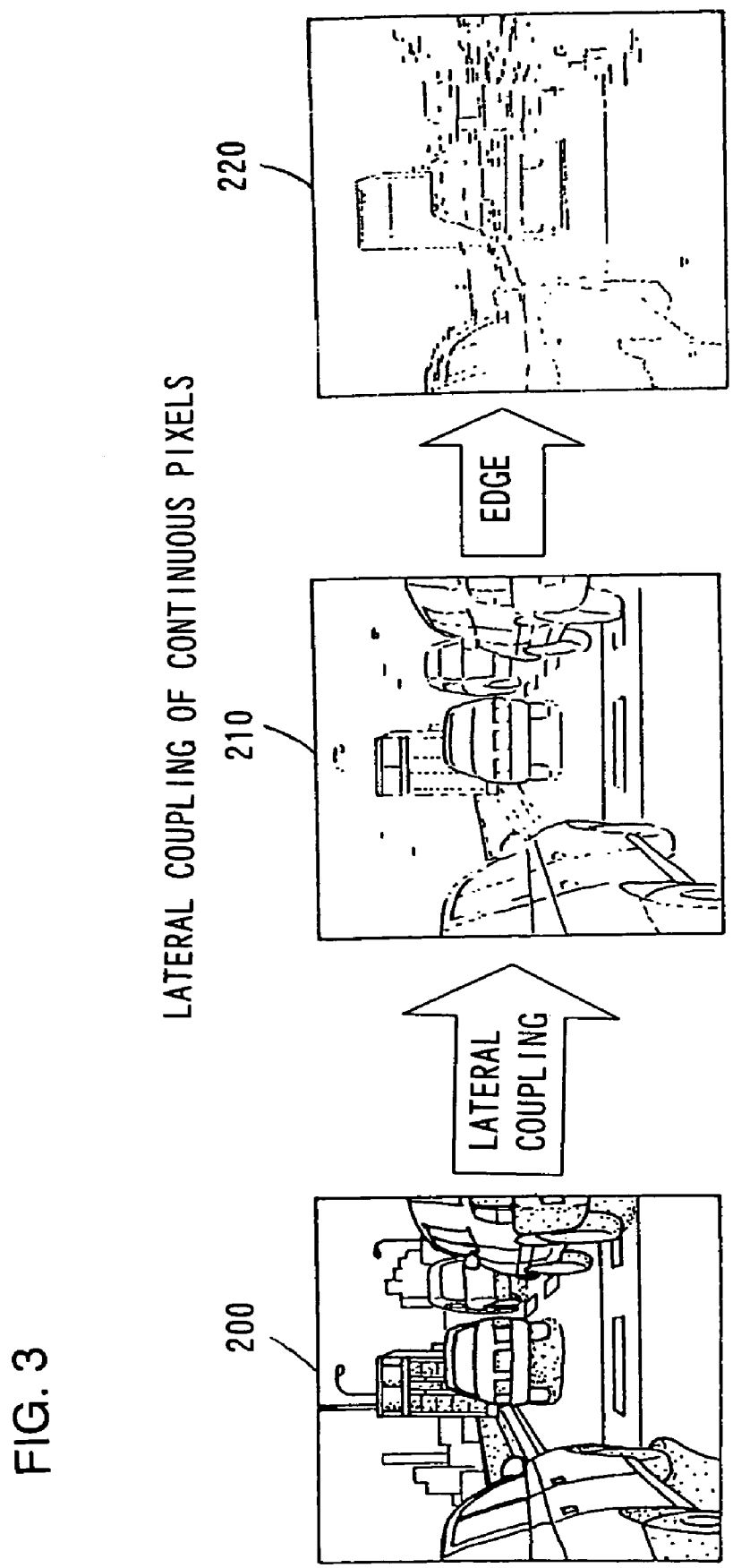
FIG. 3 shows the results of image processing executed by adding pixel outputs along the lateral direction.

FIG. 3 shows the results of image processing executed by using the sums of outputs from pixels continuous along the lateral direction. By adding together the outputs of pixels continuous along the lateral direction, a bright image can be obtained without lowering the resolution along the longitudinal direction. For this reason, a bright and high contrast image can be obtained even in an environment with a low level of illumination, e.g., night time. For instance, when detecting a preceding vehicle or a succeeding vehicle processing is executed to extract a lateral edge component (a horizontal edge component) of the target object. As a result, a highly accurate lateral edge extraction is achieved even when the level of the illumination is low without reducing the resolution along the longitudinal direction by adding together the outputs from pixels continuous along the lateral direction. In addition, by adding together the outputs of pixels continuous along the lateral direction, an image can be generated having a lateral edge component more pronounced than the longitudinal edge component.

By switching to an appropriate addition pattern in correspondence to the type of image processing executed by the processing device 4 to extract necessary information from the image data, the target object can be detected even when the level of illumination is low, without compromising the level of accuracy.

In each of the examples presented in FIGS. 2 and 3, a bright image is obtained without reducing the information corresponding to the vertical edges or the horizontal edges by adding the outputs of pixels continuous along the vertical direction or the horizontal direction in a one-dimensional pattern. However, the advantage of the invention can be further enhanced by expanding the addition pattern over a two-dimensional plane.

Figure 4:
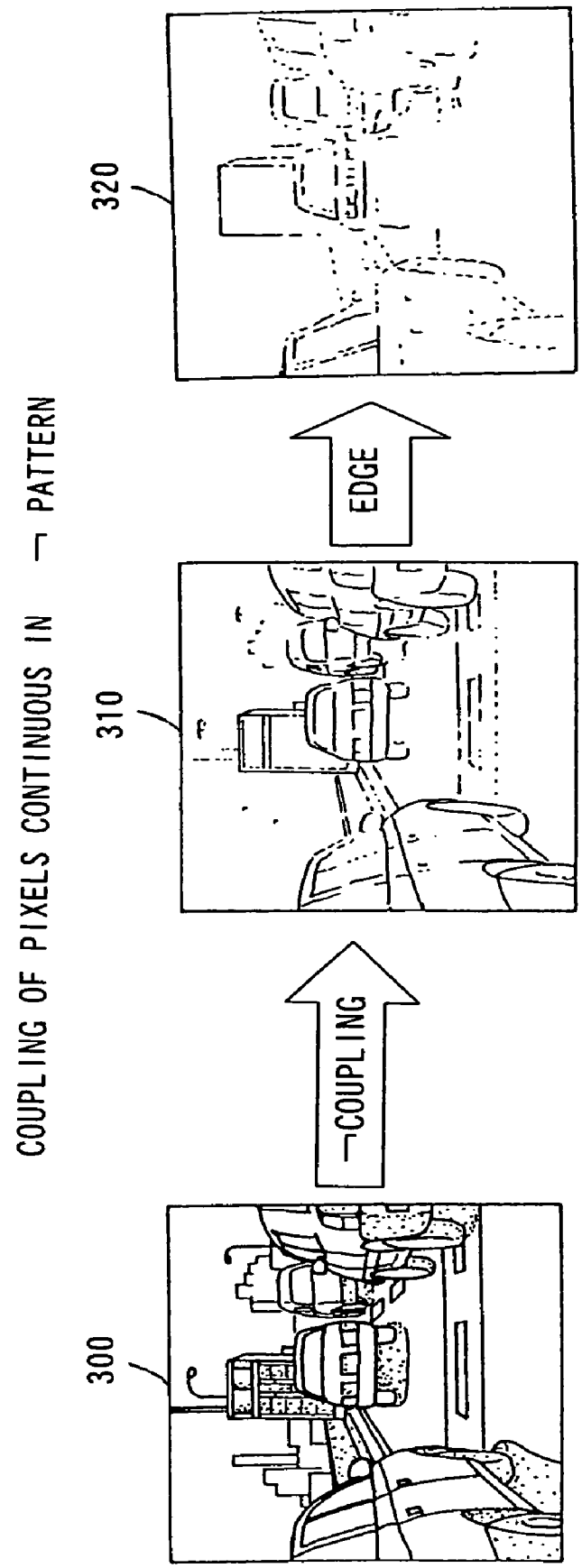
FIG. 4 shows the results of image processing executed by adding pixel outputs continuous in a "⌐" pattern.

FIG. 4 shows the results of image processing executed on image signals obtained by adding the outputs of pixels continuous in a "⎯⎤" pattern. By adding together the outputs of pixels continuous in the "⎯⎤" pattern, a bright image in which the characteristics of the "⎯⎤" pattern are emphasized is generated. This addition pattern may be adopted when, for instance, the corners of a vehicle must be detected with a high degree of accuracy.

Figure 5:
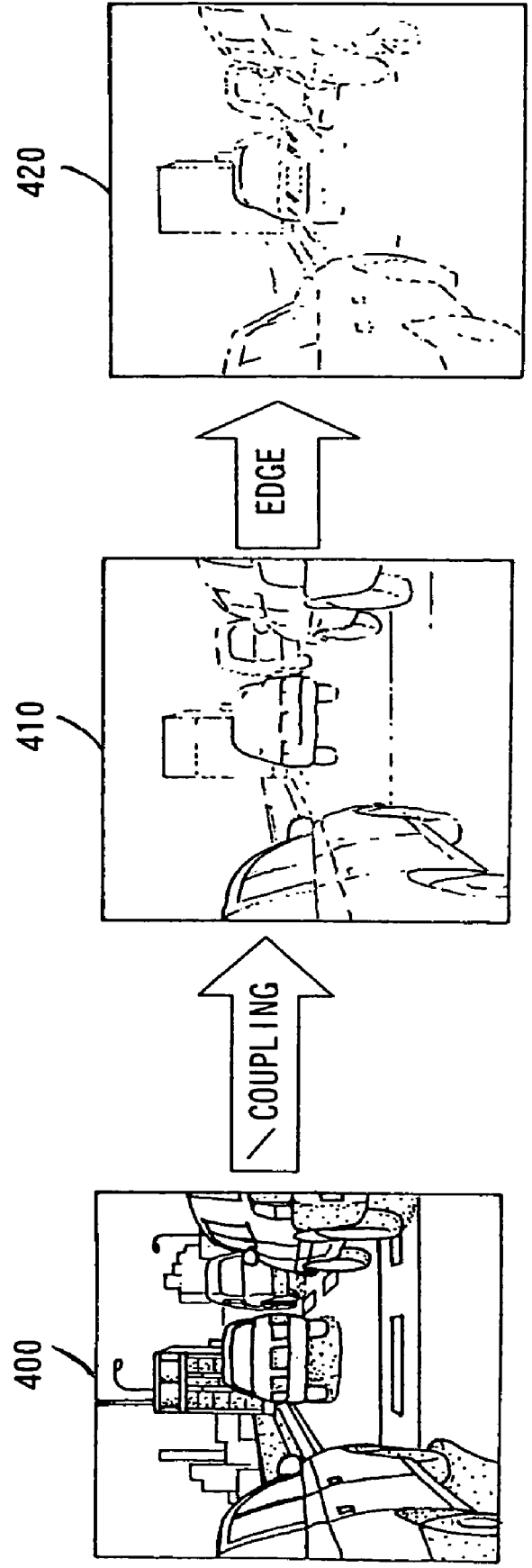
FIG. 5 shows the results of image processing executed by adding pixel outputs continuous in a "\" pattern.

FIG. 5 shows the results of image processing executed on image signals obtained by adding the outputs of pixels continuous in a "\" pattern. By adding together the outputs of pixels continuous in the "\" pattern, a bright image in which the characteristics of the "\" pattern are emphasized is generated. This addition pattern may be adopted when, for instance, a white line drawn diagonally on a road must be detected with a high degree of accuracy.

The addition patterns are not limited to the longitudinal pattern, the lateral pattern, the "⎯⎤" pattern and the "\" pattern shown in FIGS. 2 to 5. Various other patterns including, for instance, a "+" pattern, a "/\" pattern and "Δ" pattern may be used.

As described above, in the image-capturing apparatus achieved in the embodiment, the outputs of pixels present in the vicinity of a given pixel at the image-capturing element 1 are added onto the output of the pixel. The addition is executed based upon the pixel output addition pattern determined in correspondence to the type of image processing to be executed. As a result, when the processing device 4 performs image processing by using the image signals provided by the image-capturing apparatus, an edge detection can be executed in a desirable manner in an image with improved sensitivity in a low illumination condition without lowering the resolution.

In addition, by generating various addition patterns in correspondence to varying types of edges in the image to be detected through the image processing, the different types of edges, e.g., longitudinal edges, lateral edges, diagonal edges and a ⎯⎤-shaped edge, can be detected with a high degree of accuracy.

Furthermore, by generating the addition pattern in correspondence to a specific detection target type when detecting target objects such as pedestrians or vehicles through image processing, pedestrians or vehicles ahead of or behind the subject vehicle can be detected reliably.

The addition pattern may be altered for each frame of image output by the image-capturing element 1. For instance, the addition pattern may be switched for each frame by alternating between the longitudinal pattern and the lateral pattern. In this case, the processing device 4 should execute longitudinal edge extraction processing and lateral edge extraction processing in combination, each in correspondence to one of the addition patterns. It is particularly advantageous to change the addition pattern for each frame when an image-capturing element with a high frame rate is used. Since the time lag between the longitudinal addition and the lateral addition is reduced when the two types of processing are alternately executed repeatedly at a high frame rate, processing results equivalent to the results achieved by simultaneously extracting the longitudinal edges and the lateral edges with a high-sensitivity image are obtained.

Figure 6:
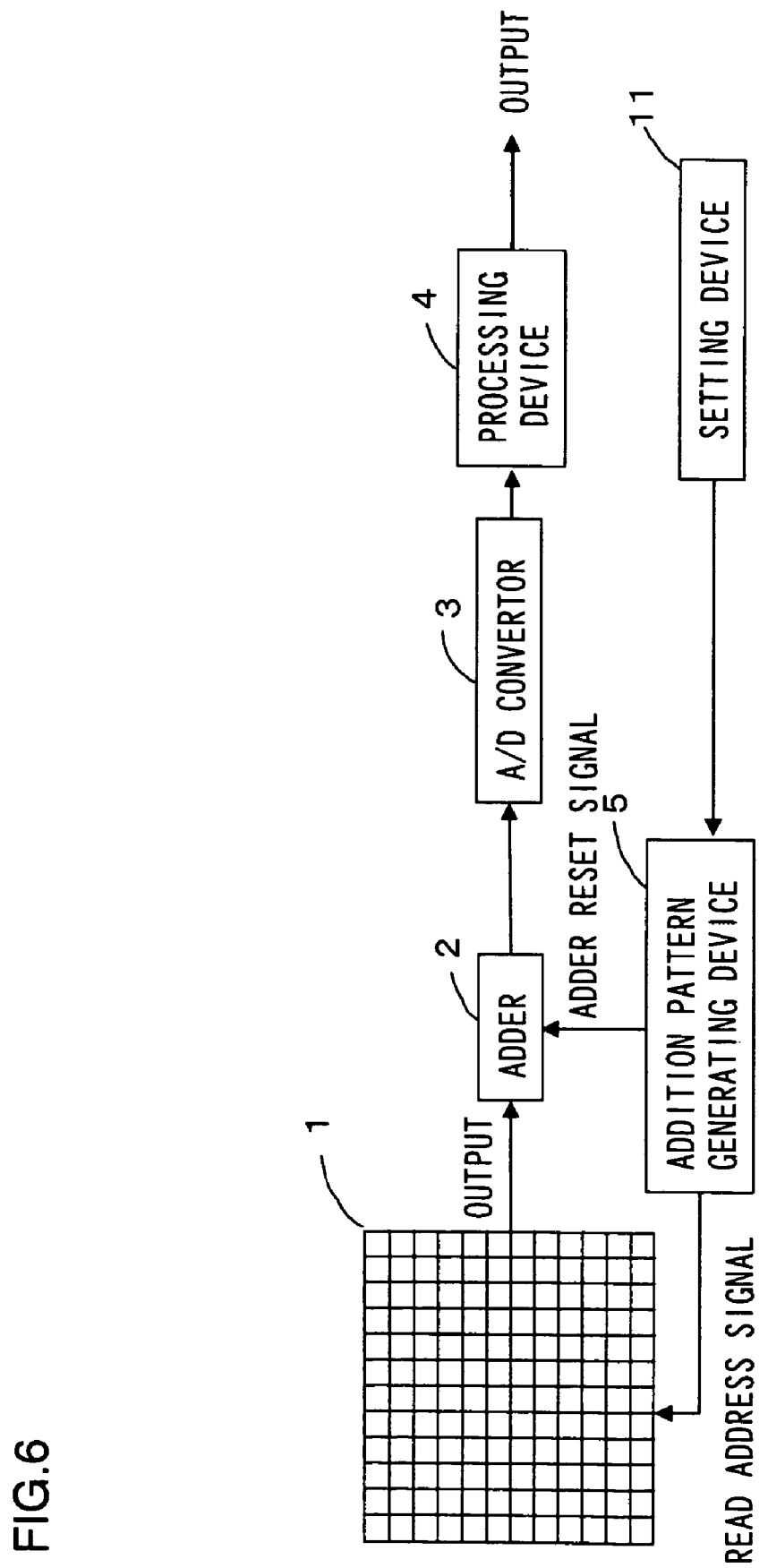
FIG. 6 presents an example of a variation of the image-capturing apparatus achieved in the first embodiment.

FIG. 6 presents another example of an image-capturing apparatus that adjusts the addition pattern in correspondence to the frame rate or the length of exposure time. In FIG. 6, the same reference numerals are assigned to components identical to those in the image-capturing apparatus shown in FIG. 1 to preclude the necessity for a repeated explanation thereof. Reference numeral 11 indicates a setting device that sets either a frame rate or a length of exposure time.

When the processing device 4 executes image processing for lateral edge detection, for instance, the number of pixels continuous along the lateral direction, the outputs of which are to be added together, can be adjusted in correspondence to the frame rate or the length of exposure time set by the setting device 11. To rephrase this by referring to the addition pattern as a lateral addition pattern, the number of pixels the outputs of which are added in the lateral addition pattern is adjusted in correspondence to the frame rate or the length of exposure time.

By executing the image processing with the image signals output from the image-capturing apparatus described above, the dynamic range can be expanded while achieving the required level of sensitivity to minimize the extent of deterioration of resolution.

Figure 7:
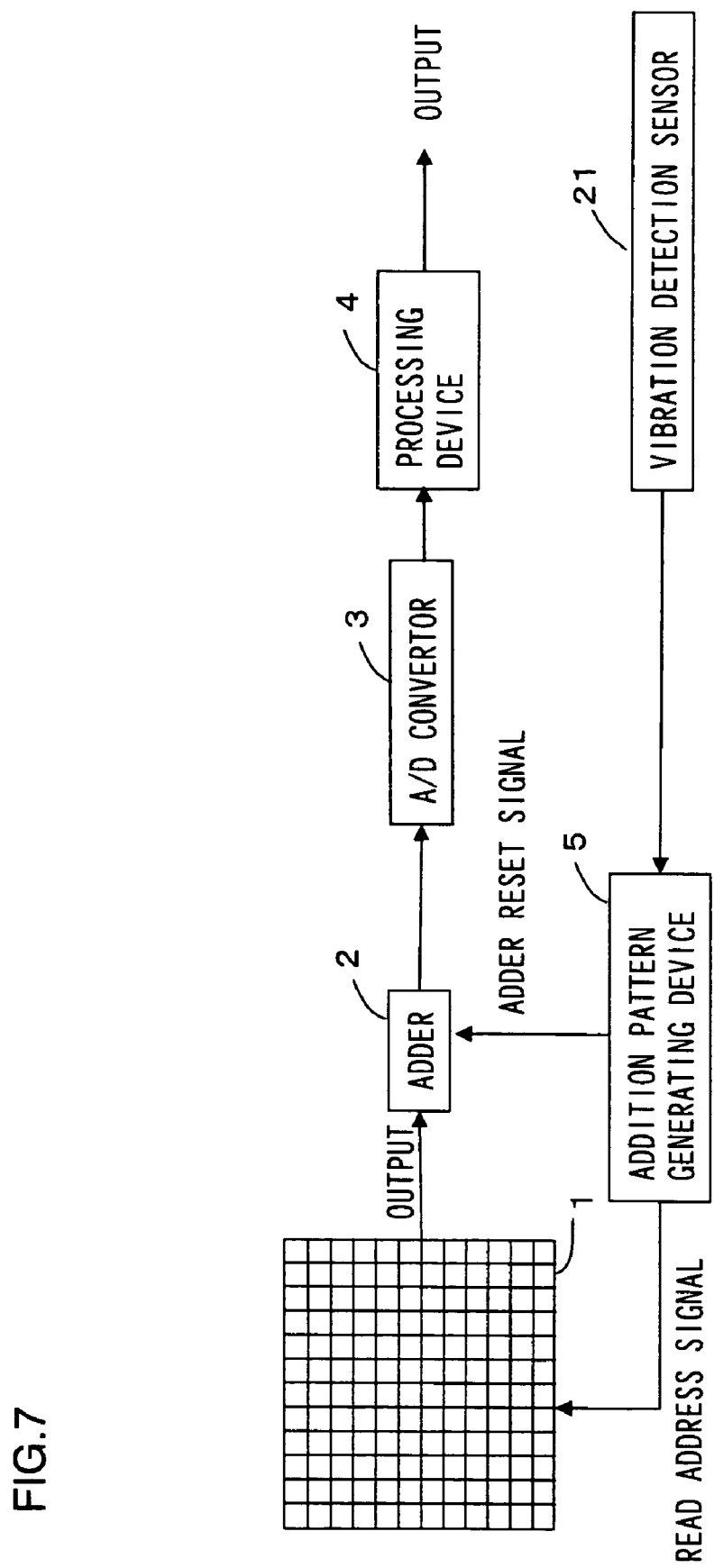
FIG. 7 presents another example of a variation of the image-capturing apparatus achieved in the first embodiment.

FIG. 7 shows another example of an image-capturing apparatus that adjusts the addition pattern in correspondence to the extent of vibration the image-capturing apparatus experiences. In FIG. 7, the same reference numerals are assigned to components identical to those in the image-capturing apparatus shown in FIG. 6 to preclude the necessity for a repeated explanation thereof. Reference numeral 21 indicates a vibration detection sensor that detects movement (vibration) of the optical axis of the image-capturing apparatus.

As the optical axis of a photographic optical system which forms a subject image on the image-capturing element 1 shifts, the image becomes blurred or smeared. In such a case, the vibration detection sensor 21 detects the movement (vibration) of the optical axis of the image-capturing apparatus. Then, an addition pattern is generated so as to add together the outputs of pixels disposed continuously along a direction matching the detected direction, i.e., the direction along which the image blur or smear has occurred.

By executing the image processing with the image signals output from such an image-capturing apparatus, the detection target image can be extracted with a high degree of sensitivity without lowering the resolution even when the optical axis of the image-capturing apparatus has shifted.

Second Embodiment

Figure 8:
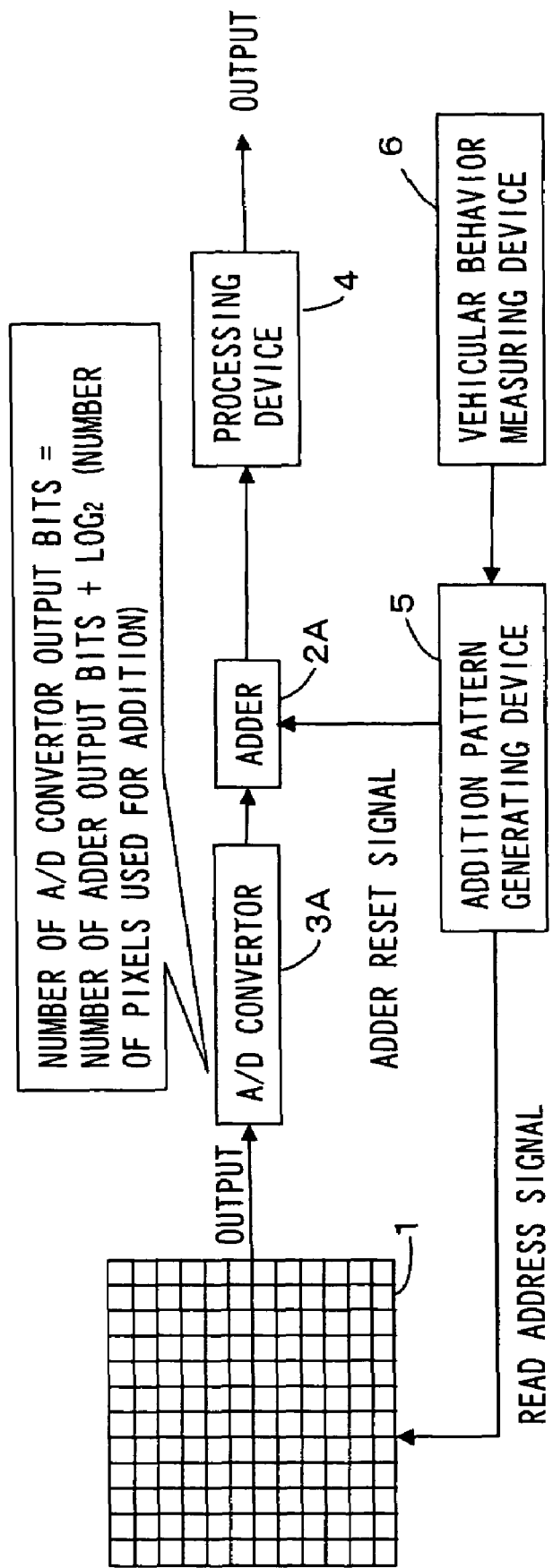
FIG. 8 shows the structure adopted in the image-capturing apparatus achieved in a second embodiment.

An image-capturing apparatus achieved in the second embodiment, which detects vehicular behavior and switches the pixel addition pattern in correspondence to the vehicular behavior, is explained in reference to FIG. 8. The same reference numerals are assigned to components and devices identical to those shown in FIG. 1 and the following explanation focuses on the differences.

An A/D converter 3A executes analog-digital conversion to enable digital processing of the output of the image-capturing element 1. In this embodiment, the number of quantization bits is defined as follows.

(number of A/D converter output bits)=(number of adder output bits)+log$_2$(number of pixels used for addition)

This makes it possible to achieve a high level of resolution at which the image processing can be executed without losing any information even under a condition of low illumination.

An adder 2A executes digital processing to add the output signals from light receiving elements at addresses specified by the addition pattern generating device 5 until a reset signal is output from the addition pattern generating device 5.

In the second embodiment, signals output from the image-capturing element 1 immediately undergo the A/D conversion and are then added together through the digital processing. However, the output signals from the image-capturing element 1 may instead be added together through analog processing and the results of the addition may then undergo A/D conversion as in the first embodiment.

A vehicular behavior measuring device 6 measures the vehicular behavior. A specific addition pattern type is determined based upon, for instance, information provided by a yaw rate sensor, which measures the vehicle motion along the yawing direction effected through steering and information provided by a vehicle height sensor which measures vertical movement of the vehicle. The addition pattern type thus determined is output to the addition pattern generating device 5.

When a pronounced vertical motion occurs at the vehicle, a pattern with which outputs are added along the longitudinal direction is indicated. When a pronounced vertical motion is occurring at the vehicle, the image becomes blurred along the longitudinal direction resulting in a lowered resolution along the longitudinal direction. For this reason, the resolution does not become any lower if the signals output from the pixels disposed along the longitudinal direction are added together. When the yaw rate of the vehicle is significant, on the other hand, a pattern with which outputs are added together along the lateral direction is indicated. When the yaw rate of the vehicle is high, the image becomes blurred along the lateral direction resulting in a lowered resolution along the lateral direction. For this reason, the resolution does not become any lower if the signals output from the pixels disposed along the lateral direction are added together.

Since the results of the image processing executed in the second embodiment are similar to the image processing results achieved in the first embodiment shown in FIGS. 2 to 5, their explanation is omitted.

The image-capturing apparatus achieved in the second embodiment detects the vehicular behavior and generates the addition pattern corresponding to the vehicular behavior. Thus, even when the vehicle moves up and down or to the left/right while traveling, the sensitivity under low illumination conditions can be improved while minimizing the extent of the deterioration of the resolution.

In the second embodiment, the addition pattern is adjusted based upon the vehicular behavior. This addition pattern adjustment may be adopted in conjunction with the addition pattern adjustment based upon the type of image processing having been explained in reference to the first embodiment and the examples of variations.

The image-capturing apparatus according to the present invention is used in a vehicle both in the first embodiment and in the second embodiment described above. However, the present invention may be adopted in all types of applications other than automotive applications, as well. For instance, it may be adopted in an image-capturing apparatus for a robot that detects the position of an object.

It is to be noted that the individual components do not need to adopt the specific structures described above as long as the functions characterizing the present invention are not compromised.

The disclosures of the following priority applications are incorporated herein by reference:

Japanese Patent Application No. 2003-142536 filed May 20, 2003

Japanese Patent Application No. 2004-072530 filed Mar. 15, 2004

What is claimed is:

1. An image-capturing apparatus comprising:
   an image-capturing unit having a plurality of pixels disposed two-dimensionally;
   an addition pattern generating unit configured to specify an addition pattern;
   an adding unit configured to generate an image by adding according to the addition pattern, outputs of selected pixels present around a given pixel at the image-capturing unit to an output of the given pixel, wherein the selected pixels are chosen according to the addition pattern; and
   an image processing unit configured to process the image resulting from addition executed by the adding unit according to a type of image processing;
   wherein:
   the addition pattern generating unit specifies different addition patterns corresponding to different types of image processing; and
   when the image processing unit switches from a first type of image processing to a second type of image processing;
   the addition pattern generating unit changes the specified addition pattern from an addition pattern corresponding to the first type of image processing to an addition pattern corresponding to the second type of image processing; and
   the adding unit switches from the addition pattern corresponding to the first type of image processing to the addition pattern corresponding to the second type of image processing when adding outputs of selected pixels.

2. An image-capturing apparatus according to claim 1, wherein:
   when the image processing unit is to execute image processing for detecting an edge in the image, the addition pattern generating unit generates the addition pattern in correspondence to a type of edge to be detected by the image processing unit.

3. An image-capturing apparatus according to claim 2, wherein:
   when the image processing unit changes the type of edge to be detected for each captured image frame, the addition pattern generating unit generates the addition pattern in correspondence to the type of edge to be detected which is altered for the each captured image frame.

4. An image-capturing apparatus according to claim 2, wherein:
   a number of pixels the outputs of which are added together with the addition pattern generated by the addition pattern generating unit in correspondence to the type of edge to be detected is adjusted in conformance to one of a frame rate and a length of exposure time set for the image-capturing unit.

5. An image-capturing apparatus according to claim 1, wherein:
   when the image processing unit is to execute image processing for detecting a predetermined target object, the addition pattern generating unit generates the addition pattern in correspondence to the target object to be detected by the image processing unit.

6. An image-capturing apparatus according to claim 5, wherein:
   a number of pixels the outputs of which are added together with the addition pattern generated by the addition pattern generating unit in correspondence to the target object to be detected is adjusted in conformance to one of a frame rate and a length of exposure time set for the image-capturing unit.

7. An image-capturing apparatus according to claim 1, wherein:
   when the image processing unit changes the type of image processing for each captured image frame, the addition pattern generating unit generates the addition pattern in correspondence to the type of image processing for the each captured image frame.

8. An image-capturing apparatus according to claim 1, wherein: p1 a number of pixels the outputs of which are added together with the addition pattern generated by the addition generating unit in correspondence to the type of image processing is adjusted in conformance to one of a frame rate and a length of exposure time set for the image-capturing unit.

9. An image-capturing apparatus according to claim 1, further comprising:
   an A/D converter that converts an analog image signal to a digital image signal, wherein:
   a number of bits output from the A/D converter is set to a value obtained by adding $\log_2$ (number of pixels used for addition) to a number of bits output from the adding unit.

10. An image-capturing apparatus comprising:
    an image-capturing unit having a plurality of pixels disposed two-dimensionally;
    an addition pattern generating unit configured to specify an addition pattern according to a vehicular behavior detected by a vehicular behavior detection device;
    an adding unit configured to generate an image by adding according to the addition pattern, outputs of selected pixels present around a given pixel at the image-capturing unit to an output of the given pixel, wherein the selected pixels are chosen according to the addition pattern; and
    an image processing unit configured to process the image resulting from addition executed by the adding unit;
    wherein:
    the addition pattern generating unit specifies different addition patterns corresponding to different types of vehicular behaviors; and
    when the detected vehicular behavior changes from a first type of vehicular behavior to a second type of vehicular behavior;
    the addition pattern generating unit changes the specified addition pattern from an addition pattern corresponding to the first type of vehicular behavior to an addition pattern corresponding to the second type of vehicular behavior; and
    the adding unit switches from the addition pattern corresponding to the first type of vehicular behavior to the addition pattern corresponding to the second type of vehicular behavior when adding outputs of selected pixels.

11. An image-capturing apparatus according to claim 10, further comprising:
    an A/D converter that converts an analog image signal to a digital image signal, wherein:
    a number of bits output from the A/D converter is set to a value obtained by adding $\log_2$ (number of pixels used for addition) to a number of bits output from the adding unit.

12. An image-capturing apparatus comprising:
    an image-capturing unit having a plurality of pixels disposed two-dimensionally;

an addition pattern generating unit configured to specify an addition pattern according to a type of vibration of the image-capturing apparatus detected by a vibration detection unit;

an adding unit configured to generate an image by adding according to the addition pattern, outputs of selected pixels present around a given pixel at an image-capturing unit having a plurality of pixels disposed two-dimensionally to an output of the given pixels, wherein the selected pixels are chosen according to the addition pattern; and an image processing unit configured to process the image resulting from addition executed by the adding unit;

wherein:

the addition pattern generating unit specifies different addition patterns corresponding to different types of vibration of the image-capturing apparatus; and when the detected vibration of the image-capturing apparatus changes from a first type of vibration to a second type of vibration;

an addition pattern generating unit changes the specified addition pattern from an addition pattern corresponding to the first type of vibration to an addition pattern corresponding to the second type of vibration; and the adding unit switches from the addition pattern corresponding to the first type of vibration to the addition pattern corresponding to the second type of vibration when adding outputs of selected pixels.

13. An image-capturing apparatus according to claim 12, further comprising:

an A/D converter that converts an analog image signal to a digital image signal, wherein:

a number of bits output from the A/D converter is set to a value obtained by adding $\log_2$ (number of pixels used for addition) to a number of bits output from the adding unit.

14. An image-capturing apparatus comprising:

image-capturing means, having a plurality of pixels disposed two-dimensionally; for capturing images;

an addition pattern generating means for generating an addition pattern;

adding means for generating an image by adding according to the addition pattern, outputs of selected pixels present around a given pixel at the image-capturing means to an output of the given pixels, wherein the selected pixels are chosen according to the addition pattern; and image processing means for processing the image resulting from addition executed by the adding means, according to a type of image processing;

wherein:

the addition pattern generating means specifies different addition patterns corresponding to different types of image processing; and when the image processing means switches from a first type of image processing to a second type of image processing:

the addition pattern generating means changes the specified addition pattern from an addition pattern corresponding to the first type of image processing to an addition pattern corresponding to the second type of image processing; and the adding means switches from the addition pattern corresponding to the first type of image processing to the addition pattern corresponding to the second type of image processing when adding outputs of selected pixels.

15. An image-capturing apparatus comprising:

image-capturing means, having a plurality of pixels disposed two-dimensionally, for generating images;

addition pattern generating means for specifying an addition pattern according to a vehicular behavior detected by a vehicular behavior detection device;

adding means for generating an image by adding according to the addition pattern, outputs of pixels present around a given pixel at the image-capturing means to an output of the given pixel, wherein the selected pixels are chosen according to the addition pattern; and an image processing means for processing the image resulting from addition executed by the adding means;

wherein:

the addition pattern generating means specifies different addition patterns corresponding to different types of vehicular behaviors; and when the detected vehicular behavior changes from a first type of vehicular behavior to a second type of vehicular behavior;

the addition pattern generating means changes the specified addition pattern from an addition pattern corresponding to the first type of vehicular behavior to an addition pattern corresponding to the second type of vehicular behavior; and the adding means switches from the addition pattern corresponding to the first type of vehicular behavior to the addition pattern corresponding to the second type of vehicular behavior when adding outputs of selected pixels.

16. An image-capturing apparatus comprising:

an image-capturing means, having a plurality of pixels disposed two-dimensionally, for capturing images;

an addition pattern generating means for specifying an addition pattern according to a type of vibration of the image-capturing means detected by a vibration detection unit;

adding means for generating an image by adding according to the addition pattern, outputs of selected pixels present around a given pixel at an image-capturing means having a plurality of pixels disposed two-dimensionally to an output of the given pixels, wherein the selected pixels are chosen according to the specified addition pattern; and image processing means for processing the image resulting from addition executed by the adding means;

wherein:

the addition pattern generating means specifies different addition patterns corresponding to different types of vibration of the image-capturing apparatus; and when the detected vibration of the image-capturing apparatus means changes from a first type of vibration to a second type of vibration:

the addition pattern generating means changes the specified addition pattern from an addition pattern corresponding to the first type of vibration to an addition pattern corresponding to the second type of vibration; and the adding means switches from the addition pattern corresponding to the first type of vibration to the addition pattern corresponding to the second type of vibration when adding outputs of selected pixels.

17. An image-capturing apparatus comprising:

generating an addition pattern according to a type of image processing;

generating an image by adding according to the addition pattern, outputs of selected pixels present around a given pixel at the image-capturing unit having a plurality pixels disposed two-dimensional to an output of the given pixel, wherein the selected pixels are chosen according to the addition pattern, and different addition patterns are generated corresponding to different types of image processing; and processing the image resulting form addition of pixel outputs, according to the type of image processing;

wherein when the image processing the image switches from a first type of image processing to a second type of image processing:

the addition pattern is changes from an addition pattern corresponding to the first type of image processing to an addition pattern corresponding to the second type of image processing; and the adding of the outputs of selected pixels is changed for utilizing the addition pattern corresponding to the first type of image processing to utilizing the addition pattern corresponding to the second type of image processing.

18. An image-capturing apparatus comprising:

generating an addition pattern according to a detected vehicular behavior, wherein different addition patterns corresponding to different types of vehicular behaviors;

generating an image by adding according to the addition pattern, outputs of selected pixels present around a given pixel at the image-capturing unit having a plurality of pixels disposed two-dimensionally to an output of the given pixel, wherein the selected pixels are chosen according to the addition pattern;

processing the image resulting from addition of pixel output;

wherein:

when the detected vehicular behavior changes from a first type of vehicular behavior to a second type of vehicular behavior;

the addition pattern is changed from an addition pattern corresponding to the first type of vehicular behavior to an addition pattern corresponding to the second type of vehicular behavior; and the adding of the outputs of selected pixels is changed from utilizing the addition pattern corresponding to the first type of vehicular behavior to utilizing the addition pattern corresponding to the second type of vehicular behavior.

19. An image-capturing apparatus comprising:

generating an addition pattern according to a type of vibration of the an image-capturing apparatus, wherein different addition patterns are generated corresponding to different types of vibration of the image-capturing apparatus;

generating an image by adding according to the addition pattern, outputs of selected pixels present around a given pixel at an image-capturing unit having a plurality of pixels disposed two-dimensionally to an output of the given pixels, wherein the selected pixels are chosen according to the addition pattern; and processing the image resulting from addition of pixel output;

wherein:

when the detected vibration of the image-captured apparatus changes from a first types of vibration to a second type of vibration;

the generated addition pattern is changed from an addition pattern corresponding to the first type of vibration to an addition pattern corresponding to the second type of vibration; and the adding of the outputs of selected pixels is changed from utilizing the addition pattern corresponding to the first type of vibration to utilizing the addition pattern corresponding to the second type of vibration when adding outputs of selected pixels.

* * * * *